United States Patent

Shaw

[11] Patent Number: 6,089,317
[45] Date of Patent: Jul. 18, 2000

[54] CYCLONIC SEPARATOR ASSEMBLY AND METHOD

[75] Inventor: Christopher K. Shaw, Claremore, Okla.

[73] Assignee: Baker Hughes, Ltd., London, United Kingdom

[21] Appl. No.: 09/104,307

[22] Filed: Jun. 24, 1998

Related U.S. Application Data

[60] Provisional application No. 60/050,584, Jun. 24, 1997.

[51] Int. Cl.[7] .............................. E21B 43/14; E21B 43/38
[52] U.S. Cl. ......................... 166/265; 166/105; 166/369; 210/170; 210/747; 210/787; 405/128
[58] Field of Search ................................. 166/105, 105.5, 166/106, 265, 369, 370; 405/128; 210/170, 747, 787, 788

[56] References Cited

U.S. PATENT DOCUMENTS

| | | | |
|---|---|---|---|
| 2,872,985 | 2/1959 | Bertuzzi et al. | 166/105.5 |
| 2,953,204 | 9/1960 | Doscher et al. | |
| 3,137,344 | 6/1964 | Wiemer . | |
| 3,705,626 | 12/1972 | Glenn, Jr. et al. | 166/267 |
| 3,707,157 | 12/1972 | Tipton et al. | 137/14 |
| 3,951,457 | 4/1976 | Redford | 299/5 |
| 3,978,926 | 9/1976 | Allen | 166/267 |
| 4,120,795 | 10/1978 | Lavel, Jr. . | |
| 4,148,735 | 4/1979 | Lavel, Jr. | 166/109.1 X |
| 4,241,787 | 12/1980 | Price | 166/288 X |
| 4,296,810 | 10/1981 | Price | 166/265 |
| 4,354,553 | 10/1982 | Hensley . | |
| 4,475,603 | 10/1984 | Hayatdavoudi | 175/65 |
| 4,488,607 | 12/1984 | Hayatdavoudi et al. | 175/65 |
| 4,688,650 | 8/1987 | Hayatdavoudi et al. | 175/324 |

(List continued on next page.)

FOREIGN PATENT DOCUMENTS

| | | |
|---|---|---|
| 0322958 A2 | 12/1988 | European Pat. Off. . |
| 0 532 397 A1 | 9/1992 | European Pat. Off. . |
| 0811749 | 5/1997 | European Pat. Off. . |
| 2194575 | 3/1988 | United Kingdom . |
| WO 89/11339 | 11/1989 | WIPO . |
| WO 94/13930 | 6/1994 | WIPO . |
| WO 96/30625 | 10/1996 | WIPO . |

OTHER PUBLICATIONS

T. Kjos, READ Group, A.S, J.F. Michelet, READ Process Engineering A.S., S. Sangesland, "Subsea and DownHole Separation Systems—The Latest Advances", Paper, Norwegin Institute of Technology, Paper No. XP 000671682;

"Downhole Oil/Water Separater Developmenta Project", Paper C–FER.

Pete Schrenkel, Robert Cox, Steve Kennedy and Bill Bowers; "Joint Industry Development of the Downhole Oil Water Separation System" (Undated).

B.E. Bowers, D.D. Lloyd, C. Matthews and P. schrenkel; "Downhole Application of Liquid–Liquid Hydrocyclones" (Undated).

B.R. Peachey and C.M. Matthews, "Downhole Oil/Water Separator Development"; *The Journal of Canadian Petroleum Technology;* vol. 33, No. 7 (Sep. 1994).

B.R. Peachey and C.M. Matthew, "Downhole Oil/Water Separator Development"; Petroleum Society of CIm, Paper No. Cim 93 (circa 1994).

"Downhole Oil/Water Separation Technology Now Proven", Centre for Engineering Research Inc., Press Release (Apr. 1, 1995).

*Primary Examiner*—George Suchfield
*Attorney, Agent, or Firm*—Thomason, Moser & Patterson, L.L.P.

[57] ABSTRACT

The present invention provides methods and apparatus for separating fluids using one or more hydrocyclone separators and a mixer disposed upstream from the hydrocyclone separators. The mixers are preferably static or rotary type mixers which mix the fluids prior to their delivery into the hydrocyclone separator. Using mixers provides a more homogeneous mixture of oil and water to the hydrocyclone separators in order to increase the efficiency of the separation. By controlling the degree of mixing it is also possible to substantially avoid the formation of emulsions.

14 Claims, 4 Drawing Sheets

U.S. PATENT DOCUMENTS

| | | |
|---|---|---|
| 4,711,720 | 12/1987 | Young ................................ 210/512.2 |
| 4,721,565 | 1/1988 | Carroll ................................... 210/251 |
| 4,738,779 | 4/1988 | Carroll et al. ..................... 210/512.2 |
| 4,749,034 | 6/1988 | Vandevier et al. . |
| 4,766,957 | 8/1988 | McIntyre ................................ 166/265 |
| 4,787,452 | 11/1988 | Jennings, jr. . |
| 4,793,408 | 12/1988 | Miffre ..................................... 166/53 |
| 4,805,697 | 2/1989 | Fouilout et al. ...................... 166/265 |
| 4,824,562 | 4/1989 | Carson ............................. 166/265 X |
| 4,832,127 | 5/1989 | Thomas et al. ........................ 166/369 |
| 4,836,935 | 6/1989 | Lilienthal .............................. 210/788 |
| 4,900,433 | 2/1990 | Dean et al. ............................ 210/170 |
| 4,913,630 | 4/1990 | Cotherman et al. ................... 417/313 |
| 5,154,588 | 10/1992 | Freet et al. .......................... 417/423.3 |
| 5,159,977 | 11/1992 | Zabaras . |
| 5,173,022 | 12/1992 | Sango .................................. 415/169.1 |
| 5,296,153 | 3/1994 | Peachey ................................ 210/787 |
| 5,320,500 | 6/1994 | Cholet .................................... 417/375 |
| 5,335,732 | 8/1994 | McIntye ................................ 166/313 |
| 5,377,756 | 1/1995 | Northrop et al. ...................... 166/267 |
| 5,456,837 | 10/1995 | Peachey ............................ 166/265 X |
| 5,497,832 | 3/1996 | Stuebinger et al. ................... 166/369 |
| 5,503,226 | 4/1996 | Wadleigh ............................ 166/252.1 |
| 5,570,744 | 11/1996 | Weingarten et al. ................... 166/357 |
| 5,603,825 | 2/1997 | Costinel ................................ 210/109 |
| 5,693,225 | 12/1997 | Lee .................................... 166/265 X |
| 5,711,374 | 1/1998 | Kjos ....................................... 166/265 |
| 5,730,871 | 3/1998 | Kennedy et al. ................... 210/512.2 |
| 5,830,368 | 11/1998 | Peachey ................................ 210/747 |
| 5,961,841 | 10/1999 | Bowers ............................. 166/265 X |

CYCLONIC SEPARATOR ASSEMBLY AND METHOD

This application claim benefit to U.S. provisional application Ser. No. 60/050,584 filed Jun. 24, 1997.

BACKGROUND OF THE INVENTION

1. Field of the Invention

This invention relates to apparatus and methods for the separation of liquids of differing densities in production streams from underground wells. More particularly, the invention relates to the downhole hydrocyclonic separation of a production stream from an oil well or ground water cleanup well into two streams, a first stream enriched in oil relative to the production stream and a second stream depleted in oil relative to the production stream, and transportation of the first, oil-enriched, stream to the surface.

2. Background of the Related Art

Cyclones are compact, centrifugal separators with no moving parts, which separate components of a mixture according to the relative densities of the components. For example, cyclones may be used to separate solids, liquids, gases or of some combination of phases from other solids, liquid, gases or combination of phases. Hydrocyclones are widely used in both onshore and offshore oil production in above-ground applications such as bulk water knockout from produced fluids or de-oiling produced water prior to either water reinjection into a formation or water disposal to a disposal site. In these applications a plurality of hydrocyclones are typically mounted within a pressure vessel assembly. Such an assembly resembles a shell-and-tube heat exchanger, in that the hydrocyclones are mounted to tube sheets which are sandwiched between flanges in the pressure vessel. The complete pressure vessel assembly typically has a single inlet for the produced liquid stream, such as a mixture of oil and water, and a plurality of outlets for the separated liquid streams. The assembly has an outlet for the "clean water" stream, which is relatively depleted in oil as compared to the production liquids, and an outlet for the "dry oil" stream, which is relatively enriched in oil as compared to the produced liquids.

Hydrocyclone type separators are able to continuously separate a production liquid stream into a heavy phase and a light phase using centrifugal forces created when a production liquid stream is provided into the conically shaped cyclone at a high speed in a substantially tangential direction. The liquid swirls around the inside of the cyclone at a high speed to create a substantial centrifugal force on the liquid which forces the heavier fluids radially outwardly from the lighter fluids. Typically, hydrocyclones will be designed to provide a centrifugal force on the liquid that is much greater than the gravitational force on the liquid, perhaps even several hundredfold greater, such that the effects of gravity on the liquid are negligible. Under these conditions, the heavy phase liquid is forced to the outer wall of the cyclone, thereby forcing the light phase liquid toward the center of the cyclone.

Because the outer wall of the cyclone is conical thereby producing a constant tangential speed to be imparted to the fluid, the heavier phase along the wall of the cone will migrate towards the end with the smaller diameter (the tail) and the lighter phase in the center will be pushed by the heavier fluid towards the end with the larger diameter (the head). In downhole applications, the capacity of a hydrocyclone separator is limited primarily by the diameter (or radius) of the separator head. The efficiency of the separator, i.e., the separator's ability to separate a heavy phase and a light phase, is a function of the square of the liquid tangential speed divided by the separator radius. Therefore, an efficient separation requires a high tangential speed. If the radius of the separator is increased, then the speed must also be increased to maintain a given efficiency. If the formation pressure acting on the liquid is low, then the speed of the liquid entering the separator will be slow and the separator must be designed with a sufficiently small radius in order to obtain a desired separation efficiency.

Hydrocyclones, as they are employed in oil production and environmental cleanup applications, are designed foremost to remove oil from water, that is, to produce a clean water stream with as low a concentration of oil as practicable. The dry oil stream will typically contain about 50 percent water, by volume, and may contain more than 50 percent water. Hydrocyclones, in a single-stage configuration, cannot produce both a completely water-free oil stream and a completely oil-free water stream; the design performance must be biased towards either the "dry oil" stream or the "clean water" stream. A clean water stream is obtained at the expense of "wet oil." Conversely, a dry oil stream is obtained at the expense of oily water. Hydrocyclone designs that are exemplary of those in the art are described in British Patent Application GB-A-2248198, which is incorporated herein by reference for all purposes, and U.S. Pat. No. 4,237,006, which is incorporated herein by reference for all purposes. Multi-stage separator assemblies including multiple hydrocyclones arranged in series, such as taught by U.S. Pat. No. 4,738,779, incorporated herein by reference for all purposes, can achieve improved separation at the expense of increasing the pressure drop of the liquids moving through the multi-stage assembly.

Hydrocyclones are also useful for making a preliminary separation of oil from water in the production liquids produced downhole in an oil well prior to the production liquids being transported to the surface. This is of particular value in high water cut wells, with a high water content, where the production liquids may comprise about 70 percent, or more, water. Conventionally, this water must be transported above ground, at significant cost and then disposed of, at additional expense. Hydrocyclone assemblies designed for above-ground use however, are not suitable for downhole applications where the assembly must be disposed within the bore hole of an oil well. This is because conventional hydrocyclone assemblies of sufficient capacity exceed the size limitations imposed by the diameter of the well. Further, previous attempts to overcome these problems have resulted in additional complications.

For example, PCT International Application WO 94/13920 discloses a downhole separation apparatus in which one or more hydrocyclones are contained within an axially elongate tubular housing, with the inlet of each hydrocyclone extending through the wall of the housing and having an opening external of the housing. The separated dry oil and clean water streams from each hydrocyclone are transported from the housing by a relatively complex system of pipes. With this apparatus there must be sufficient clearance between the housing and the adjacent wall of the well casing to provide a flow annulus for transporting the production fluid to the hydrocyclone inlets. This limits the diameter of the hydrocyclone housing for a given size casing, and hence reduces the capacity of the separation apparatus.

In applications where the formation pressure of the producing formation is too low, pumps and associated pump driving equipment, are required to lift produced fluids to the surface or to assist in the reinjection of water. WO 94/13930, for example, discloses placing a pump on the clean water stream to assist in reinjection of the clean water into the formation. U.S. Pat. No. 5,296,153 discloses pumping the dry oil stream to the surface and the clean water stream to another formation. In applications where the formation pressure is sufficient to drive fluid recovery, pumps are typically disposed downstream from the separator on the water outlet line to assist in the reinjection of the water into a selected formation. FIG. 1 shows a representative configuration for a downhole hydrocyclone separator assembly which is driven by the formation pressure. The hydrocyclone separator 24 is disposed in a well bore 10 in fluid communication with one or more production perforations and the resulting production stream. A by pass line 28 is connected to the water outlet of the separator and is connected to a pump 31 driven by a motor 29. The production zone 55 is defined at its lower end by a packer 57. The production fluids enter the casing through the perforations 23 and fill the volume in which the separator is disposed. The production fluids then enter the separator where the oil is recovered lifted to the surface and the water is routed for disposal. Typically, the pump 31 assists in the transportation of the water to a disposal area or zone. In these applications, it has been found that hydrocyclone separators in certain instances do not operate as effectively as in the applications where a pump is located upstream from the separator. It is believed that this reduction in effectiveness is attributable to the fact that the pump acts secondarily as a pre-input mixer to deliver a homogeneous mixture of oil, gas and water into the separator. However, many pumps provide mixing that is so vigorous that an oil-water emulsion is formed. The difficulties associated with breaking emulsion is well-documented. Therefore, while an upstream pump may increase the overall separator efficiency, it may also create an emulsion problem.

Therefore, there is a need for a separator assembly and methods that operates efficiently to separate oil and water. It would be desirable if the separator assembly provided the separator with a more homogeneous mixture of oil and water (and gas) than that of the production fluid without forming emulsions.

SUMMARY OF THE INVENTION

The present invention generally provides a separator assembly and methods of separating production fluids comprising a mixer disposed upstream from a separator. In one embodiment, the invention provides an apparatus for separating fluids in situ in a well bore, the apparatus comprising a hydrocyclone separator sized and adapted for passage in a well bore hole and having at least one inlet and at least two outlets, and a fluid mixing member sized and adapted for passage in a well bore hole and disposed on the inlet side of the hydrocyclone separator. The apparatus may further comprise one or more pumps connected to at least one of the outlets of the hydrocyclone separator. Furthermore, the hydrocyclone outlets may comprise a water-rich outlet and/or an oil-rich outlet and may further comprise one or more pumps connected to the water-rich outlet and/or the oil-rich outlet. Preferably, the fluid mixing member, such as a static or rotary mixer, causes a pressure drop, most preferably between about 5 and about 15 pounds per square inch.

The invention also provides a method of separating production fluids in a well bore, comprising the steps of (a) routing the production fluids into a mixing member; then (b) routing the production fluids into a hydrocyclone separator; and then (c) separating the production fluids. The production fluids are preferably separated into a water-rich fluid and/or an oil-rich fluid. It is also beneficial to pump one or more of the separated fluids to one or more collecting locations. In one application, the water-rich fluid may be pumped into a disposal zone and the oil-rich fluid may be pumped uphole.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
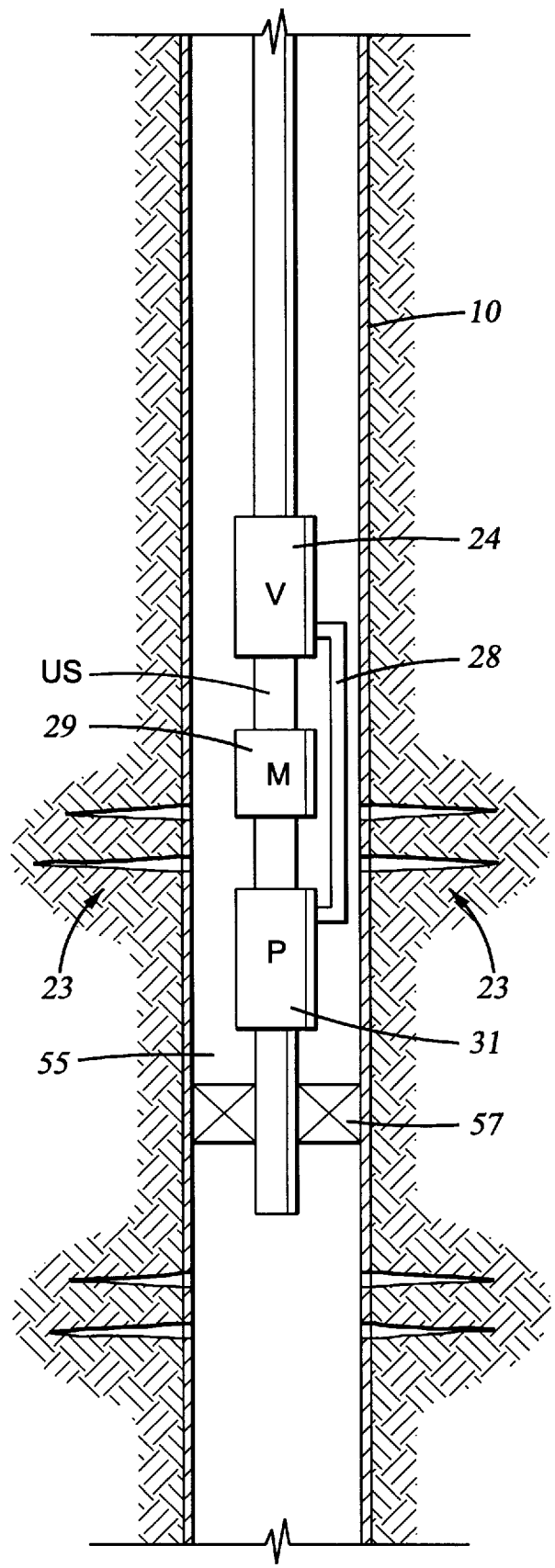
FIG. 1 is a drawing of a prior art separator assembly.

The present invention generally provides methods and apparatus for delivering one or more production fluids into a separator to facilitate and enhance the separation of the fluids by the separator. In one aspect of the invention, a mixer, such as a rotary mixer or a static mixer, is disposed upstream from a separator inlet to enable delivery of a generally homogeneous or consistent mixture of production fluid to the separator which can be more effectively separated by the separator. As used herein, the term "homogeneous" is used in reference to the production fluid to mean that the fluid is substantially free from large slugs of either the oil phase or water phase and, preferably, has a substantially constant or gradually changing composition representative of the bulk production fluid. The use of a mixer is particularly advantageous in applications where the formation pressure in the production zone is sufficiently high to allow efficient operation of the separator without a pump on the inlet side of the separator. In these applications, a pumping system may be in fluid communication with the separator overflow (e.g., dry oil) outlet stream to pump the production fluids up the drill string and the separator underflow (e.g., water) outlet stream to assist in the reinjection of unwanted fluids at another location. The details of both the methods and apparatus will be discussed in more detail below in reference to the figures.

In accordance with the present invention, it has been found that the efficiency of hydrocyclone separators is reduced or limited by the discontinuous nature of some production fluids. Production fluids may be naturally discontinuous or become discontinuous during production, such as where the separator is disposed a significant distance uphole from the production zone. The production fluid passing through the production tubing string or the annulus between the production tubing string and the casing forms a column of fluid which can vary in height depending on the distance between the production perforation and the separator. The distance may approach 1,000 feet or more. Where the column height is significant, the production fluid may begin to separate into a heavy phase and light phase due to gravitational forces acting on the column. Consequently, even if the production fluid passing through the production perforations is mixed or homogeneous, the production fluid may form slugs of either or both phases, i.e., water and oil, prior to entering the separator. These slugs have been found to reduce the separator efficiency.

Consequently, the present invention provides for a fluid mixing device or apparatus to be disposed upstream of the separator, preferably adjacent the separator assembly, and having its output in fluid communication with the separator inlet. Mixing of the fluid prior to separation provides a more homogeneous mixture of fluids to the separator, thereby allowing the separation to operate efficiently. However, it is important that the degree of mixing be controlled. For example, where the production fluid is at a low pressure, pumps may be disposed on the inlet side of the separator to pressurize the fluid into the separator. The pumping action provides mixing, but the mixing is so vigorous that the fluid forms emulsions that are not significantly separable by the hydrocyclone separator.

The rotary or static mixers of the present invention provide controlled mixing. These mixers will preferably cause a pressure drop in the production fluid that is between about 5 psi and about 15 psi. It is believed that a pressure drop of at least about 5 psi provides a beneficial degree of mixing and that a pressure drop of less than about 15 psi will avoid the formation of emulsions. A typical pressure drop across a hydrocyclone separator is about 50 psi.

Figure 2:
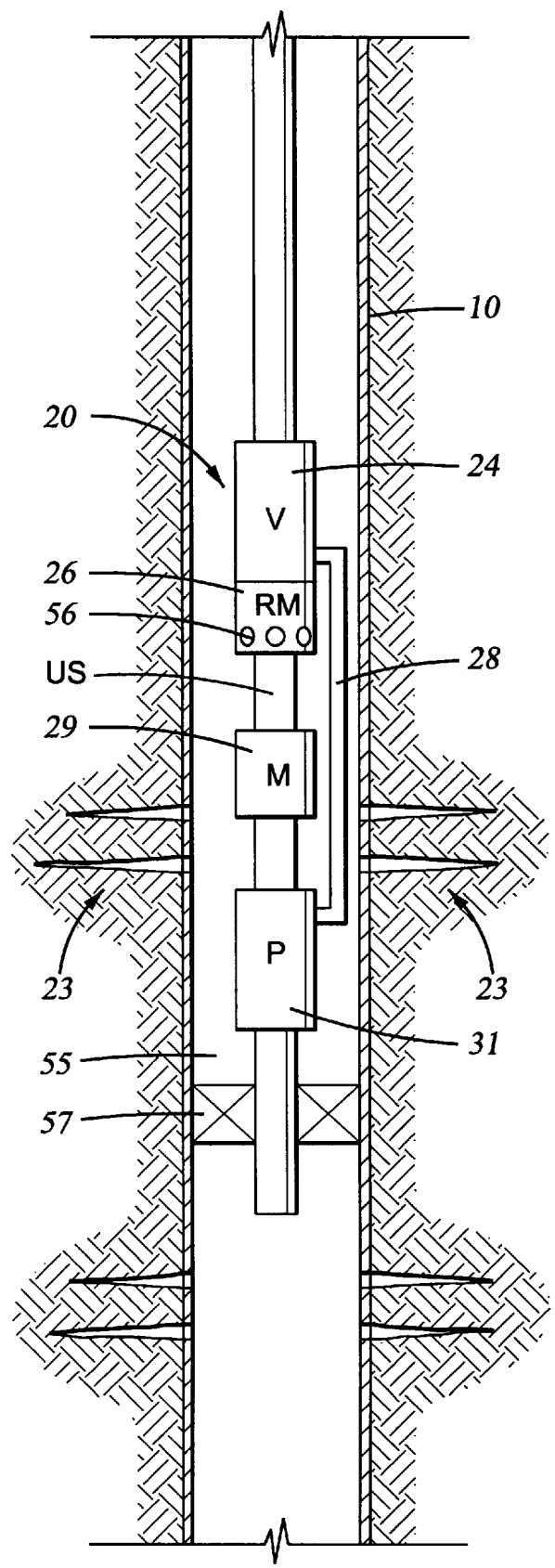
FIG. 2 is a schematic representation of one embodiment of the present invention disposed in a well bore.

FIG. 2 is a simplified schematic cross sectional view of a well bore 10 having one embodiment of a hydrocyclone separator assembly 20 of the present invention disposed therein. Generally, the assembly 20 comprises a hydrocyclone separator 24 having a mixer 26 disposed upstream therefrom. The mixer 26 receives production fluids through one or more inlets 56 provided therethrough and mixes the fluids before delivering the fluids to the hydrocyclone separator 24. A bypass tube 28 is connected to the water outlet side of the separator 24 and is in fluid communication with a pump 31 driven by a motor 29. The pump drives the delivery of the separated water-enriched stream to a disposal site which may be uphole, downhole or above the surface, preferably downhole.

Figure 3:
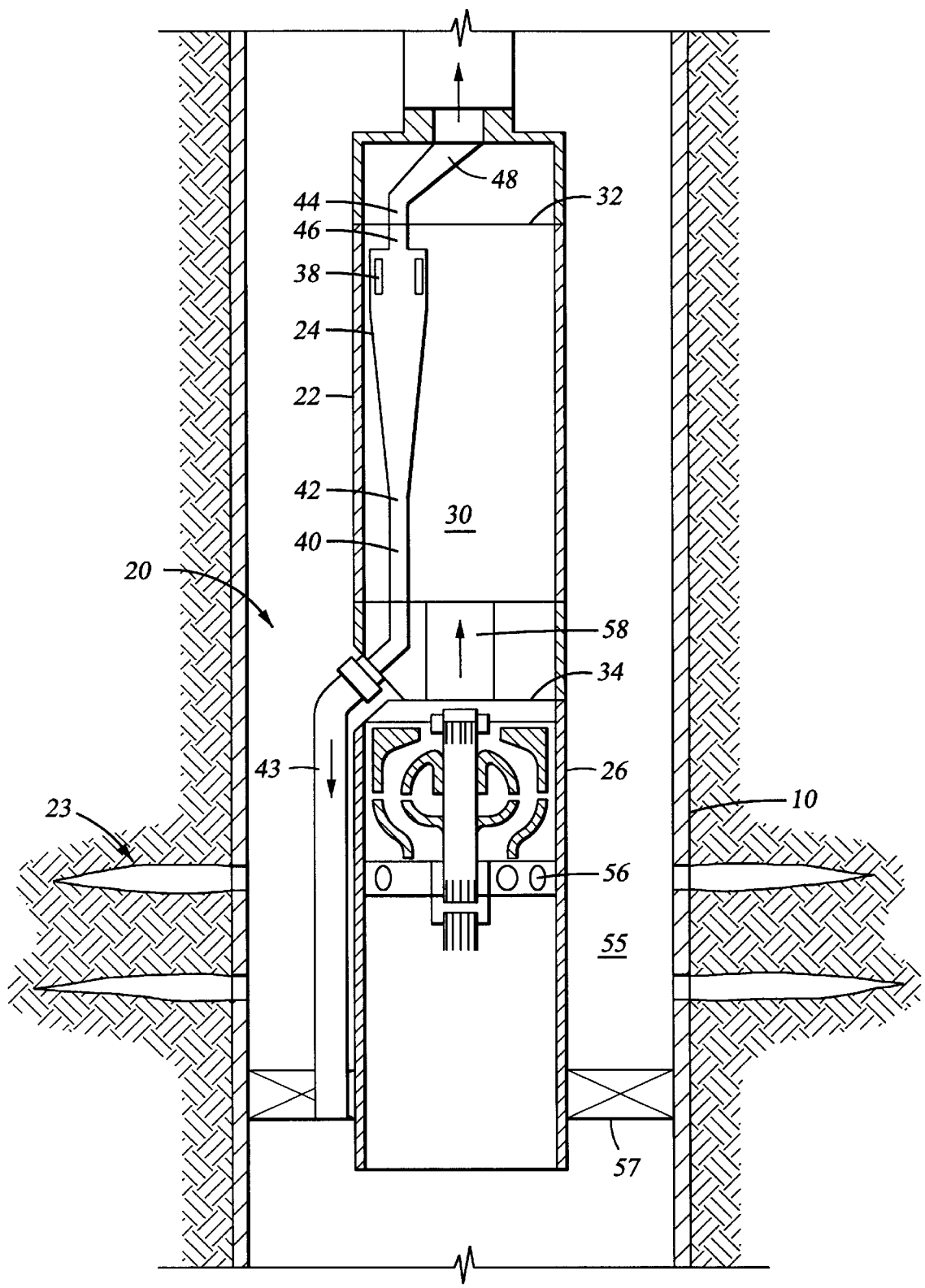
FIG. 3 is a schematic, partial cross sectional view of one embodiment of the present invention disposed in a well bore.

FIG. 3 is a partial cross sectional view of one embodiment of the assembly 20 disposed in a well bore. In this embodiment, the hydrocyclone separator 24 is disposed in a chamber 30 having an inlet 58 thereto located at the lower end of the chamber. Optionally, upper and lower support plates 32, 34, respectively, may be provided for supporting the piping and the hydrocyclone separator 24 within the chamber 30. If support plates 32, 34 are used, production openings (not shown) are provided in the support plates so that the internal chamber 30 remains open to production fluids. One or more mixers 26 are disposed on the inlet side of the hydrocyclone separator 24 and deliver homogeneous production fluid into the internal chamber 30 where the mixture then flows into the inlets 38 of the hydrocyclone separator 24. The outlets 42, 44 of the hydrocyclone separator 24, one or more of them, may be pumped to pull the production fluid through the hydrocyclone separator 24.

The hydrocyclone separator 24 is preferably of a well-known, de-oiling configuration such as that described in British Patent Application GB-A-2248198, and has one or more tangential inlets 38 which are open to the interior of the housing 22. An underflow pipe 40 is hydraulically connected to an underflow outlet 42 of the hydrocyclone separator 24, and is hydraulically connected to an underflow manifold 43. Similarly, an overflow outlet pipe 44 is connected to the overflow outlet 46 of the hydrocyclone separator 24, and is connected to an overflow manifold 48.

In the embodiment shown in FIG. 3, a rotary type mixer is disposed in a production zone 55 defined at its lower end by a packer 57. Production fluids enter the casing through perforations 23. A plurality of fluid inlets 56 are disposed circumferentially around the lower portion of the mixer 26 to deliver the produced fluids into the mixer where they are mixed and introduced into a central passage 58 and then into the internal chamber 30. In an alternative embodiment, a static type mixer 26, is used to mix the production fluids prior to their delivery into the hydrocyclone separator 24.

In operation, one or more separator assemblies 20 are run into the well bore with minimal clearance between the exterior wall of the housing 22 and the interior wall of the well casing. Production fluid, which is under pressure from the production zone or a pump, enters the mixer 26 through the inlets 56. The production fluids are intermixed within the mixer 26 to form a homogeneous production fluid mixture, but preferably not violently enough to form an emulsion. Preferably, a pressure drop of between about 5 psi and about 15 psi is present across the hydrocyclone separator. The production fluid mixture then passes into the internal chamber 30 and eventually into the hydrocyclone separator 24 through inlets 38.

In the hydrocyclone separator 24, the production fluid is separated into a water-enriched stream which flows to the underflow or "clean water" outlet 42 and an oil-enriched stream which flows to the overflow or "dry oil" outlet 46. As noted above, the clean water stream is enriched in water relative to the production liquid stream, while the dry oil stream is enriched in oil relative to the production stream. The underflow stream from the hydrocyclone separator 24 flows through the underflow outlet pipe 40 to underflow manifold 43, and is preferably transported downhole below assembly 20 through the packer 57 for disposal or reinjection into the same or different formation. The dry oil stream from the overflow outlet 46 flows up through the overflow outlet pipe 44 to overflow manifold 48, and then to the surface where it may be further treated. In applications where a single hydrocyclone assembly is disposed within the oil well, underflow pipe 40 is preferably connected to a disposal pipe (not shown) below housing 22, whereby manifolds 43, 48 are no longer necessary.

An overflow pump may be provided for pumping the overflow or dry oil stream to the surface. Additionally, or alternatively, an underflow pump may be provided for pumping the underflow or clean water stream to a reinjection site or other disposal site. The pumps may be driven by drive means such as one or more drive motors. For illustration and not by way of limitation, the pumps may be electric submersible pumps, progressive cavity pumps, or beam (or rod) pumps, all of which are well known in the art. Many other types and combinations of pumps and drive systems may be successfully used in accordance with the present invention, such as jet pumps and gas lift systems. As will be readily apparent to one skilled in the art, a range of artificial lift systems may be used in conjunction with the natural reservoir pressure without departing from the scope of the present invention.

The pumps and drive motors are preferably disposed below the separator assembly 20 and are connected to a power source (not shown) which supplies electric or hydraulic power to the drive motor. Other arrangements of pumps and drive motors with respect to separator assembly 20 are, of course, possible without departing from the scope of the invention.

Figure 4:
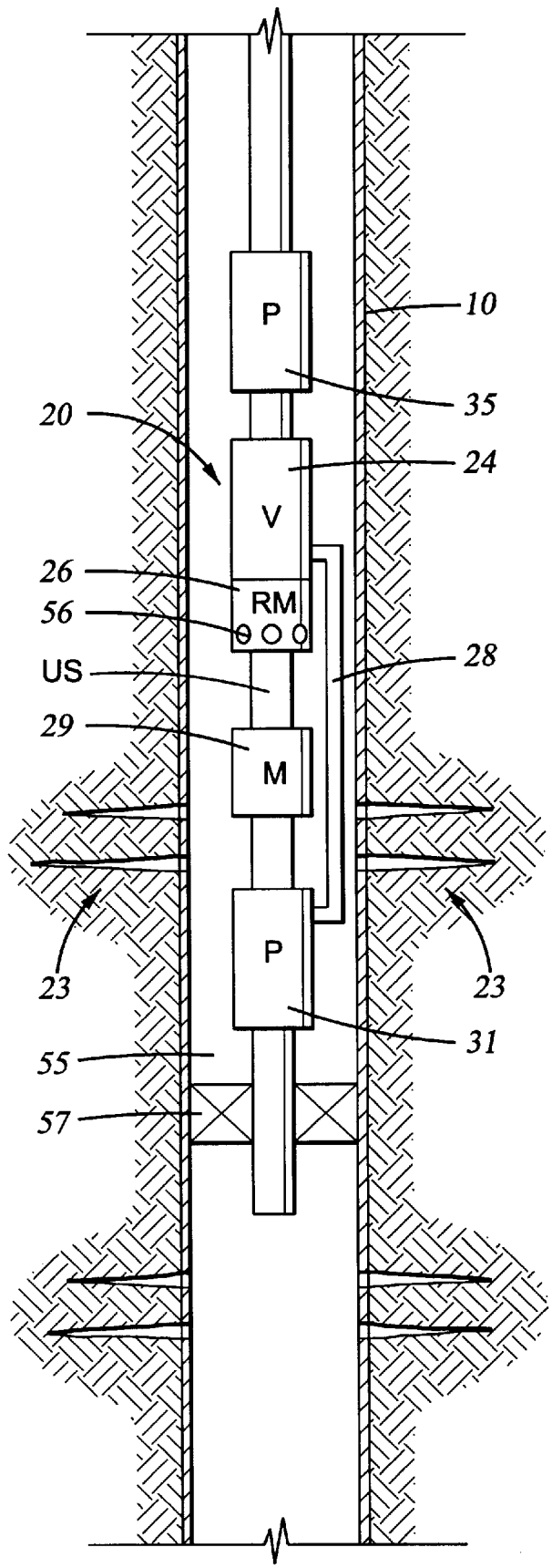
FIG. 4 is a schematic cross sectional view of an alternative embodiment of the assembly shown in FIG. 2.

FIG. 4 is a simplified schematic cross sectional view of an alternative embodiment of the assembly shown in FIG. 2. One or more pumps 35 may be disposed downstream from the separator 24 and can be used to pump an oil-rich stream from the separator 24 uphole to the surface.

While the foregoing is directed to the preferred embodiment of the present invention, other and further embodiments of the invention may be devised without departing from the basic scope thereof, and the scope thereof is determined by the claims which follow.

What is claimed is:

1. An apparatus for separating fluids in situ in a well bore, comprising:
    a) a hydrocyclone separator sized and adapted for passage in a well bore hole and having at least one inlet and at least two outlets; and
    b) a fluid mixing member sized and adapted for passage in a well bore hole and disposed on the inlet side of the hydrocyclone separator.

2. The apparatus of claim 1, further comprising:
    c) one or more pumps connected to at least one of the outlets of the hydrocyclone separator.

3. The apparatus of claim 1, wherein the at least two outlets comprise a water-rich outlet and an oil-rich outlet.

4. The apparatus of claim 3, further comprising:
    c) one or more pumps connected to the water-rich outlet.

5. The apparatus of claim 3, further comprising:
    c) one or more pumps connected to the oil-rich outlet.

6. The apparatus of claim 1, wherein the fluid mixing member causes a pressure drop.

7. The apparatus of claim 6, wherein the pressure drop is between about 5 and about 15 pounds per square inch.

8. The apparatus of claim 1, wherein the fluid mixing member is a static mixer.

9. The apparatus of claim 1, wherein the fluid mixing member is a rotary mixer.

10. A method of separating production fluids in a well bore, comprising:
    a) routing the production fluids into a mixing member; then
    b) routing the production fluids into a hydrocyclone separator;
    c) separating the production fluids to form an oil-rich fluid; and
    d) pumping the oil-rich fluid uphole.

11. The method of claim 10, further comprising:
    pumping one or more of the separated fluids to one or more collecting locations.

12. The method of claim 10, wherein separating the production fluids further comprises separating the fluids to form a water-rich fluid.

13. The method of claim 12, further comprising pumping the water-rich fluid into a disposal zone.

14. The method of claim 13, wherein the disposal zone is downhole.

* * * * *